(12) United States Patent
Amineh et al.

(10) Patent No.: US 10,961,841 B2
(45) Date of Patent: Mar. 30, 2021

(54) REMOTE FIELD EDDY CURRENT TECHNIQUE FOR CORROSION INSPECTION OF MULTIPLE PIPES INCLUDING TRANSITION SECTIONS

(71) Applicant: Halliburton Energy Services, Inc., Houston, TX (US)

(72) Inventors: Reza Khalaj Amineh, Houston, TX (US); Burkay Donderici, Houston, TX (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 318 days.

(21) Appl. No.: 15/773,532

(22) PCT Filed: Jun. 2, 2017

(86) PCT No.: PCT/US2017/035774
§ 371 (c)(1),
(2) Date: May 3, 2018

(87) PCT Pub. No.: WO2018/222209
PCT Pub. Date: Dec. 6, 2018

(65) Prior Publication Data
US 2019/0078434 A1    Mar. 14, 2019

(51) Int. Cl.
*E21B 47/092* (2012.01)
*G01B 7/06* (2006.01)
(Continued)

(52) U.S. Cl.
CPC .......... *E21B 47/092* (2020.05); *E21B 47/085* (2020.05); *E21B 47/13* (2020.05);
(Continued)

(58) Field of Classification Search
CPC ...... G01N 27/902; G01N 27/82; G01N 27/90; G01N 27/9046; G01N 17/04; G01B 7/10;
(Continued)

(56) References Cited

U.S. PATENT DOCUMENTS

| 4,843,320 A | 6/1989 | Spies |
| 7,960,969 B2 | 6/2011 | Mouget et al. |

(Continued)

FOREIGN PATENT DOCUMENTS

WO    2015050840    4/2015

OTHER PUBLICATIONS

International Search Report and Written Opinion for Application No. PCT/US2017/035774 dated Feb. 28, 2018.
(Continued)

*Primary Examiner* — Amy He
(74) *Attorney, Agent, or Firm* — John Wustenberg; C. Tumey Law Group PLLC

(57) ABSTRACT

Systems and methods for corrosion detection of downhole tubulars. A method may include disposing an electromagnetic logging tool in a wellbore, wherein the electromagnetic logging tool may comprise a transmitter and a receiver; making a first measurement with the electromagnetic logging tool in a first nominal section of the wellbore, wherein the first nominal section may comprise M pipes, wherein M may be a number of pipes positioned in the first nominal section; making a second measurement with the electromagnetic logging tool in a second nominal section of the wellbore, wherein the second nominal section may comprise N pipes, wherein N may be a number of pipes in the second nominal section, wherein N may be different than M; calculating a phase difference between the first and second measurements; calculating a thickness difference between the first and second measurements; calculating a first slope
(Continued)

from at least the phase difference and the thickness difference; making a third measurement in a non-nominal section of the wellbore; and calculating a thickness associated with a depth of the third measurement using at least the first slope and the third measurement.

20 Claims, 6 Drawing Sheets

(51) Int. Cl.
| | |
|---|---|
| E21B 47/13 | (2012.01) |
| E21B 47/26 | (2012.01) |
| E21B 47/085 | (2012.01) |
| G01N 17/00 | (2006.01) |
| G01N 17/04 | (2006.01) |
| G01N 27/90 | (2006.01) |
| G01V 3/28 | (2006.01) |
| G01V 3/30 | (2006.01) |
| G01V 3/34 | (2006.01) |
| G01V 3/38 | (2006.01) |
| G01N 27/82 | (2006.01) |
| G01V 3/08 | (2006.01) |

(52) U.S. Cl.
CPC ............... *E21B 47/26* (2020.05); *G01B 7/10* (2013.01); *G01N 17/006* (2013.01); *G01N 17/04* (2013.01); *G01N 27/82* (2013.01); *G01N 27/90* (2013.01); *G01N 27/9046* (2013.01); *G01V 3/28* (2013.01); *G01V 3/30* (2013.01); *G01V 3/34* (2013.01); *G01V 3/38* (2013.01); *G01V 3/08* (2013.01); *G01V 3/081* (2013.01)

(58) Field of Classification Search
CPC . G01B 7/06; G01V 3/081; G01V 3/08; G01V 3/28; G01V 3/30; G01V 3/34; E21B 47/092; E21B 47/00; E21B 47/13; E21B 47/26; E21B 47/085
See application file for complete search history.

(56) References Cited

U.S. PATENT DOCUMENTS

| | | |
|---|---|---|
| 9,562,877 B2 | 2/2017 | Amineh et al. |
| 9,745,845 B2 | 8/2017 | San Martin et al. |
| 2013/0193953 A1 | 8/2013 | Yarbro et al. |
| 2015/0204648 A1* | 7/2015 | Nichols ................. E21B 47/092 324/229 |
| 2015/0241596 A1 | 8/2015 | Donderici |
| 2016/0245779 A1 | 8/2016 | Khalaj Amineh et al. |
| 2017/0191361 A1 | 6/2017 | Amineh et al. |
| 2019/0218904 A1* | 7/2019 | Fouda ................... E21B 47/085 |

OTHER PUBLICATIONS

S. M. Haugland, "Fundamental analysis of the remote-field eddy-current effect", IEEE Transactions on Magnetics, vol. 32, No. 4, pp. 3195-3211, 1996.

J. Garcia et al., "Successful application of a new electromagnetic corrosion tool for well integrity evaluation in old wells completed with reduced diameter tubular," Presented Mar. 26-28, 2013. IPTC 16997.

A. A. Arbuzov et al., "Memory magnetic imaging defectoscopy," presented Oct. 16-18, 2012. SPE 162054.

* cited by examiner

REMOTE FIELD EDDY CURRENT TECHNIQUE FOR CORROSION INSPECTION OF MULTIPLE PIPES INCLUDING TRANSITION SECTIONS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a borehole, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect EM log data, where the EM log data may be interpreted to correlate a level of flux leakage or EM induction with corrosion. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to systems and methods for corrosion detection of downhole tubulars, for example, such as casing and pipes (e.g., casing string, a plurality of concentric pipes). This disclosure may relate to Eddy current techniques for multiple pipe characterizations.

Figure 1:
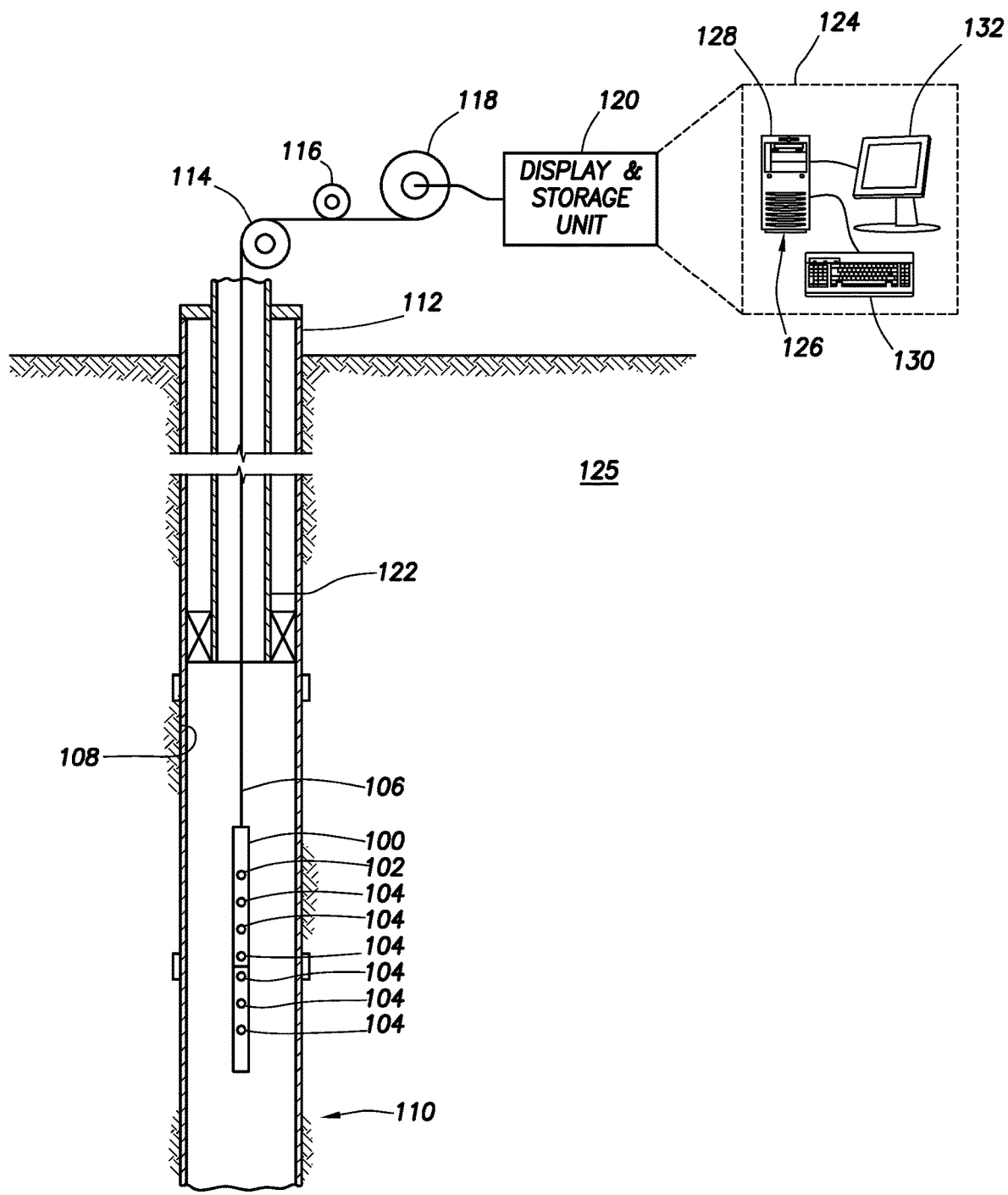
FIG. 1 is an example illustration of an operating environment for an EM logging EM logging tool.

FIG. 1 illustrates an operating environment for an EM logging tool 100 as disclosed herein. EM logging tool 100 may comprise transmitter 102 and receivers 104. EM logging tool 100 may be operatively coupled to a conveyance 106 (e.g., wireline, slickline, coiled tubing, pipe, downhole tractor, or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at the surface, for example, by display and storage unit 120. Display and storage unit 120 may also contain an apparatus for supplying control signals and power to the downhole tool assembly, wherein the downhole tool assembly comprises EM logging tool 100. A typical casing string 108 may extend from wellhead 112 at or above ground level to a selected depth within a wellbore 110. Casing string 108 may comprise a plurality of joints or segments of casing, each segment being connected to the adjacent segments by a threaded collar.

FIG. 1 also illustrates a typical pipe string 122, which may be positioned inside of casing string 108 extending part of the distance down wellbore 110. Pipe string 122 may be production tubing, tubing string, casing string, or other pipe disposed within casing string 108. Pipe string 122 may include concentric pipes. The EM logging tool 100 may be dimensioned so that it may be lowered into the wellbore 110 through the pipe string 122, thus avoiding the difficulty and expense associated with pulling the pipe string 122 out of the wellbore 110.

In logging systems, such as, for example, logging systems utilizing the EM logging tool 100, a digital telemetry system may be employed, wherein an electrical circuit may be used to both supply power to the EM logging tool 100 and to transfer data between display and storage unit 120 and EM logging tool 100. A DC voltage may be provided to the EM logging tool 100 by a power supply located above ground level, and data may be coupled to the DC power conductor by a baseband current pulse system. Alternatively, the EM logging tool 100 may be powered by batteries located within the downhole tool assembly, and/or the data provided by the EM logging tool 100 may be stored within the downhole tool assembly, rather than transmitted to the surface during logging (corrosion detection).

EM logging tool 100 may be used for excitation of transmitter 102. Transmitter 102 may transmit magnetic fields into subterranean formation 125. The magnetic fields from transmitter 102 may be referred to as a primary magnetic field. The primary magnetic fields may produce Eddy currents in the concentric pipes disposed in wellbore 110, such as casing string 108 and pipe string 122. These Eddy currents, in turn, produce secondary magnetic fields that may be sensed along with the primary magnetic fields by the receivers 104. Characterization of the casing string 108 and pipe string 122, including determination of pipe attributes, may be performed by measuring and processing these magnetic fields. Pipe attributes may include, but are not limited to, pipe thickness, pipe conductivity, and/or pipe permeability. Non-limiting examples of suitable transmitters 102 may include a coil and a solenoidal winding of any shape. As an example, receivers 104 may include receiver coils (e.g., tilted receiver coils), magnetometer receivers, or solenoidal winding of any shape.

As illustrated, the receivers 104 may be positioned on the EM logging tool 100 at selected distances (e.g., axial spacings) away from the transmitter 102. The axial spacings of the receivers 104 from the transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring electromagnetic fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and a separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Transmission of electromagnetic fields by the transmitter 102 and the recordation of signals by the receivers 104 may be controlled by display and storage unit 120, which may include an information handling system 124. As illustrated, the information handling system 124 may be a component of the display and storage unit 120. Alternatively, the information handling system 124 may be a component of EM logging tool 100. An information handling system 124 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 124 may be a personal computer, a network storage device, or any other suitable device and may vary in size, shape, performance, functionality, and price. The information handling system 124 may include a processing unit 126 (e.g., microprocessor, central processing unit, etc.) that may process EM log data by executing software or instructions obtained from a local or remove non-transitory computer readable media 128 (e.g., optical disks, magnetic disks). The non-transitory computer readable media 128 may store software or instructions of the methods described herein. Non-transitory computer readable media 128 may include any instrumentality or aggregation of instrumentalities that may retain data and/or instructions for a period of time. Non-transitory computer readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing The information handling system 124 may also include input device(s) 130 (e.g., keyboard, mouse, touchpad, etc.) and output device(s) 132 (e.g., monitor, printer, etc.). The input device(s) 130 and output device(s) 132 provide a user interface that enables an operator to interact with EM logging tool 100 and/or software executed by processing unit 126. For example, the information handling system 124 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 122). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 122). The primary magnetic fields produce Eddy currents in the concentric pipes. These Eddy currents, in turn, produce secondary magnetic fields that may be sensed along with the primary magnetic fields by the receivers 104. Characterization of the concentric pipes may be performed by measuring and processing these magnetic fields.

In time domain EC techniques, which may also be referred to as pulsed EC ("PEC"), the transmitter 102 may be fed by a pulse. Similar to the frequency domain EC technique, transient primary magnetic fields may be produced due the transition of the pulse from "off" to "on" state or from "on" to "off" state (more common). These transient magnetic fields produce Eddy currents in the concentric pipes (e.g., casing string 108 and pipe string 122). The Eddy currents, in turn, produce secondary magnetic fields that may be measured by receivers 104 placed at some distance on the EM logging tool 100 from the transmitter 102, as shown on FIG. 1. Alternatively, the secondary magnetic fields may be measured by a co-located receiver (not shown) or with the transmitter 102 itself.

It should be understood that will casing string 108 is illustrated as a single casing string, there may be multiple concentric pipes disposed in the section of wellbore 110 with casing string 108. EM log data may be obtained in two or more sections of wellbore 110 with multiple concentric pipes. For example, EM logging tool 100 may make a first measurement in a first nominal section 111 of the wellbore 110, wherein the first nominal section 111 comprises M pipes, wherein M is a number of pipes positioned in the first nominal section 111. Nominal may denote a section of pipe where the pipe has no "substantial" change in thickness, which may be close in value to the thickness indicated in a well plan. "Substantial" may mean more than about 1% for the first pipe, about 2% for the second pipe, about 4% for the third pipe, about 6% for the fourth pipe and about 8% for any deeper pipes. EM logging tool 100 may make a second measurement in a second nominal section 113 of the wellbore 110, wherein the second nominal section 113 comprises N pipes, wherein N is a number of pipes in the second nominal section 113, wherein N is different than M. EM logging tool 100 may calculate a phase difference between the first and second measurements and a thickness difference between the first and second measurements. EM logging tool 100 may calculate a first slope from the phase difference and the thickness difference. EM logging tool 100 may make a third measurement in a "non-nominal" section 115 of the wellbore 110. A "non-nominal" section may denote a section where the thicknesses are substantially different than the nominal thicknesses. EM logging tool 100 may utilize the first slope and the third measurement to calculate a thickness associated with a depth of the third measurement. EM logging tool 100 may make an operational decision (e.g., intervention or production decisions) based on the thickness associated with the depth of the third measurement. The first, second, and third measurements may be made in a remote field eddy current regime. The remote field eddy current regime may include a frequency of about 1 Hz to about 200 Hz and a spacing of about 12 inches (30.5 cm) to about 60 inches (152.4 cm) between the transmitter 102 and receivers 104. EM logging tool 100 may make a fourth measurement in a third nominal section 117 of the wellbore 110, wherein the third nominal section 117 comprises K pipes. EM logging tool 100 may make a fifth measurement in a fourth nominal section 119 of the wellbore 110, wherein the fourth nominal section 119 comprises L pipes, wherein L is different than K. EM logging tool 100 may calculate a phase difference between the fourth and fifth measurements. EM logging tool 100 may calculate a thickness difference between fourth and fifth measurements. EM logging tool 100 may calculate a second slope from the phase difference and thickness difference. EM logging tool 100 may make a sixth measurement in a non-nominal section 123 of the wellbore 110. EM logging tool 100 may utilize the first and second slope and the sixth measurement to calculate a thickness associated with a depth of the sixth measurement. EM logging tool 100 may utilize a linear combination of the first and second slopes to calculate the thicknesses associated with the third and sixth measurements. An operational decision based on the thickness associated with the depth of the sixth measurement may be made.

In frequency domain EC, as mentioned above, when the frequency of the excitation is adjusted so that multiple reflections in the wall of the pipe (e.g., casing string 108 or pipe string 122) are insignificant and the spacing between the coils is large enough that the contribution to the mutual impedance from the dominant (but evanescent) waveguide mode is small compared to the contribution to the mutual impedance from the branch cut component, the remote-field eddy current (RFEC) effect may be observed. In a RFEC regime, the mutual impedance between the coil of transmitter 102 and coil of one of the receivers 104, may be sensitive to the thickness of the pipe wall. To be more specific, the phase of the impedance varies as:

$$\varphi = 2\sqrt{\frac{\omega\mu\sigma}{2}}t \quad (1)$$

and the magnitude of the impedance shows the dependence:

$$\exp[-2(\sqrt{\omega\mu\sigma/2})t] \quad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \quad (3)$$

The phase of the impedance varies as:

$$\varphi \simeq 2\frac{t}{\delta} \quad (4)$$

and the magnitude of the impedance shows the dependence:

$$\exp[-2t/\delta] \quad (5)$$

Figure 2:
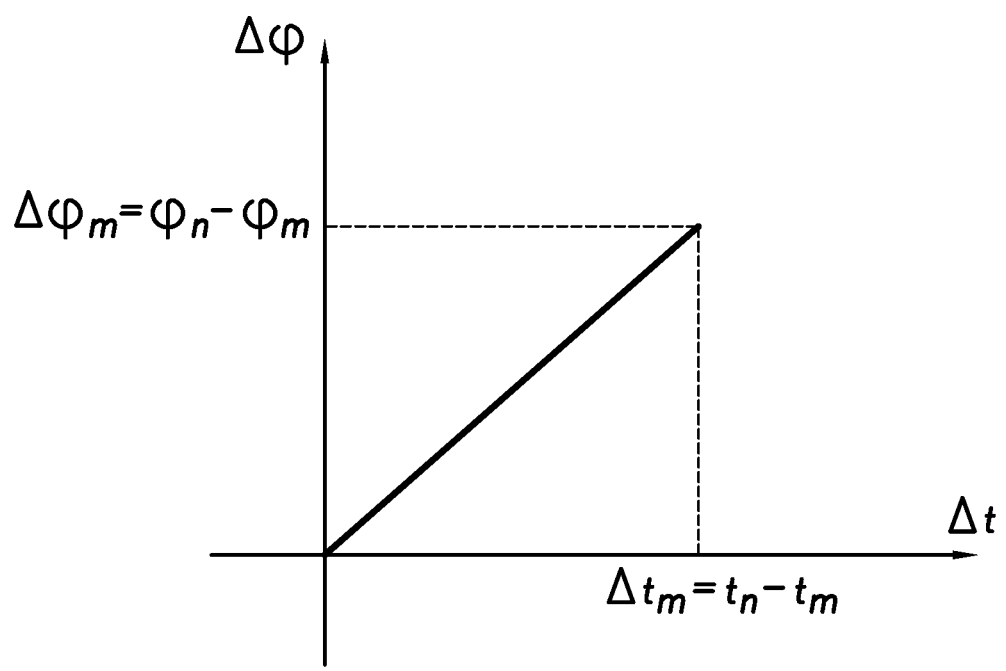
FIG. 2 is a graphical example illustrating an approach to eliminate the need for performing simulation to derive the linear variation.

In RFEC, the estimated quantity may be the overall thickness of the metal. Thus, for multiple pipes, the estimated parameter may be the overall or sum of the thicknesses of the pipes. The quasi-linear variation of the phase of mutual impedance with the overall metal thickness can be employed to perform fast estimation to estimate the overall thickness of multiple pipes. For this purpose, for any given set of pipes dimensions, material properties, and tool configuration, such linear variation can be constructed quickly and be used to estimate the overall thickness of the pipes quickly. To establish this linear variation two simulations can be performed. One simulation with the nominal section of the pipes (overall thickness $t_n$) and a second simulation with an overall thickness change for the pipes such that this overall thickness change ($\Delta tm=tn-tm$) is larger than any possible overall thickness change for the test configuration. By having the simulated phases $\varphi_n$ and $\varphi_m$ corresponding to overall thicknesses of $t_n$ and $t_m$, a line can be stablished representing the change in the phase of the received responses versus the overall thickness change, as shown in FIG. 2. By using this estimation line, any change in the phase of the measured response can be inverted to the change in the overall thickness of the pipes.

FIG. 2 graphically illustrates establishing the linear variation for estimation based on the RFEC assumptions. An approach to eliminate the need for performing simulation to derive the linear variation is shown in FIG. 2. The change in the measured phase when the number of pipes changes during the logging process may be employed. In order to employ RFEC assumptions, a priori may need to be known, for example, through simulation of a well plan with transmitter-receiver distances and a frequency to be utilized. For typical pipes used in cased boreholes, transmitter-receiver distances larger than 35 inches (89 cm) and frequencies around 1 Hz may be suitable candidates. However, frequencies may range from about 1 Hz to about 200 Hz. The aforementioned approach may have one or more of the following advantages: (i) It may not require the use of modeling tools, (ii) It may reduce estimation errors that may occur due to inaccurate simulations or the mis-match between the simulated and measured phases, (iii) It may lead to more accurate overall thickness estimation of multiple pipes that may ultimately lead to a significant positive impact on the production process.

Figure 3B:
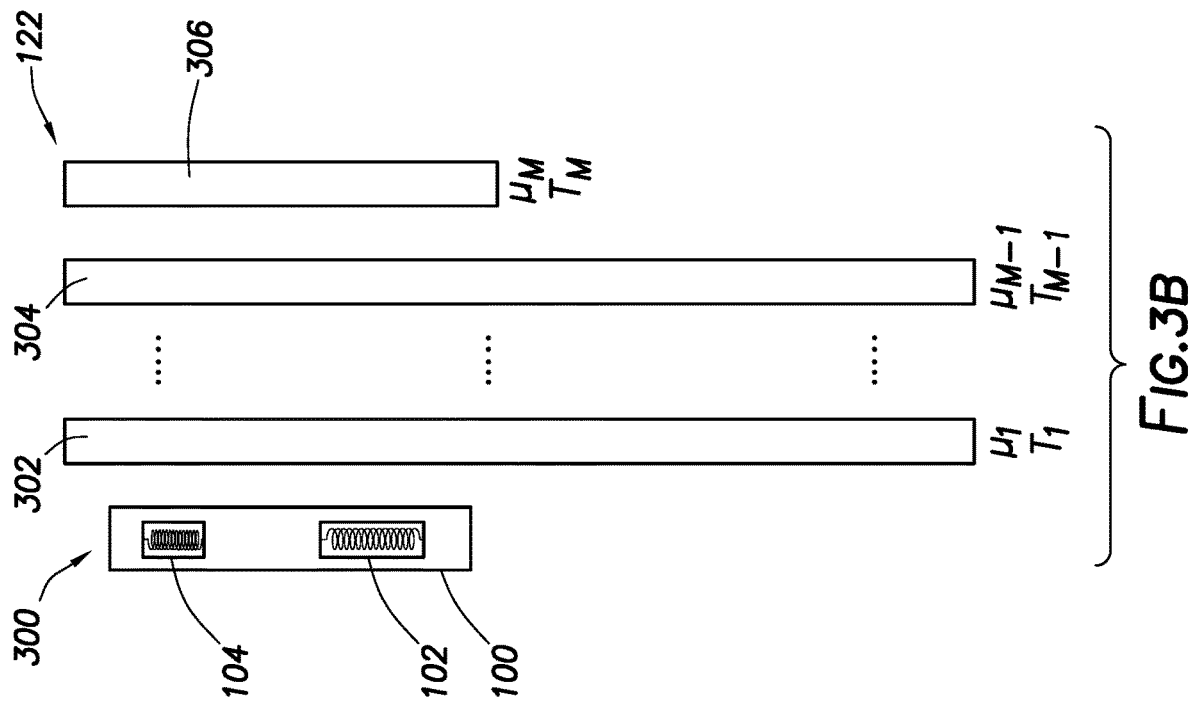
FIGS. 3A and 3B are example schematics illustrating positions of an EM logging tool within a casing string.
Figure 3A:
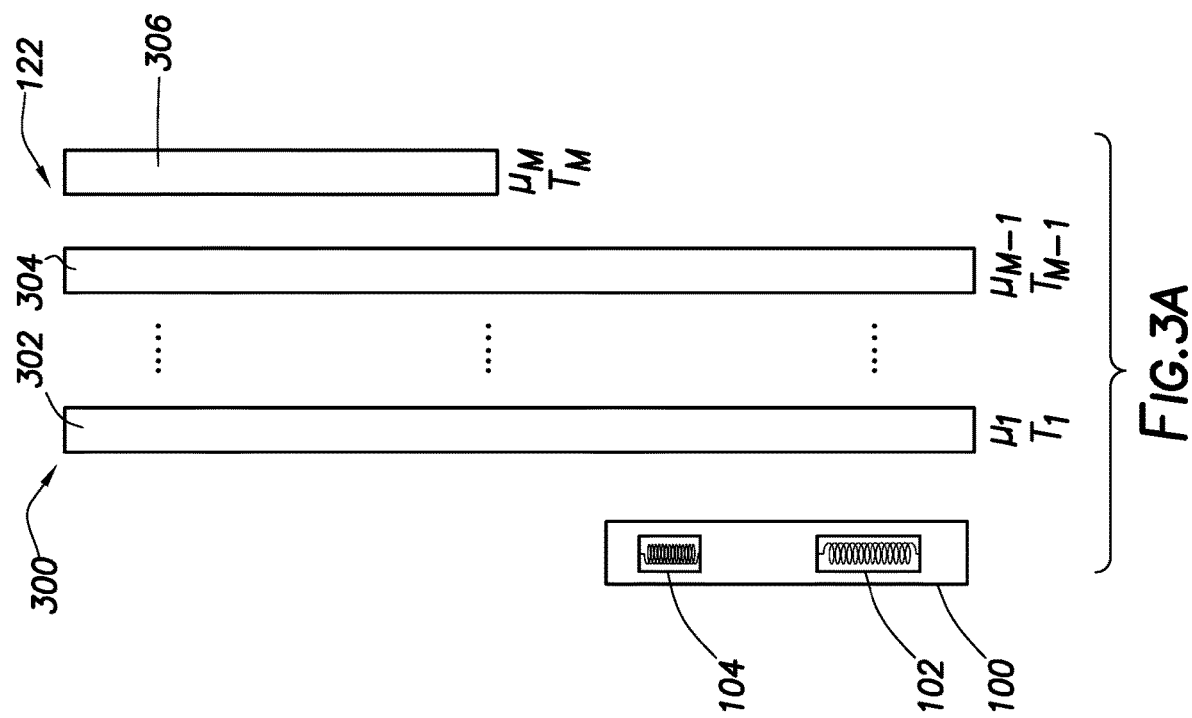

Using Phase Difference measured for M pipes to M−1 pipes for overall thickness estimation in sections with M pipes or M−1 pipes: Assume that a RFEC tool (e.g., EM logging tool 100) is employed for overall thickness estimation of M pipes as shown in FIGS. 3A and 3B with relative magnetic permeabilities and thicknesses of $\mu_i$ and $T_i$ (i=1, . . . , M), respectively. The phase of the received response when the EM logging tool 100 may be in position 1, i.e., FIG. 3A, (measuring M−1 pipes) and when the tool may be in position 2, i.e., FIG. 3B, (measuring M pipes) may be denoted by $\phi_{M-1}$ and $\phi_M$, respectively. FIGS. 3A and 3B are schematic illustrations of an example multi-pipe configuration for EM logging tool 100. As illustrated, EM logging tool 100 may be positioned within multiple concentric pipes. Multiple concentric pipes 300 may comprise first downhole tubular 302, second downhole tubular 304, and third downhole tubular 306. First downhole tubular 302 may be the innermost of the multiple concentric pipes 300 and third downhole tubular 306 may be the outermost of the multiple concentric pipes 300 with second downhole tubular 304 positioned between first downhole tubular 302 and third downhole tubular 306. While multiple concentric pipes 300 on FIGS. 3A and 3B include only three downhole tubular, it should be understood that a multi-pipe configuration for EM logging tool 100 may include two, three, four, five, or more concentric pipe strings. As illustrated, EM logging tool 100 may include transmitter 102 and receiver 104, which may be in the form of coils. Measurements from receivers 104 may be processed to determine attributes of the multiple concentric pipes 300. In FIG. 3A, EM logging tool 100 is positioned to measure M−1 pipes (e.g., first downhole tubular 302 and second downhole tubular 304). In FIG. 3B, EM logging tool 100 is positioned to measure M pipes (e.g., first downhole tubular 302, second downhole tubular 304, and third downhole tubular 306). Using the values of $\phi_{M-1}$ and $\phi_M$ and the pre-known nominal thickness for M pipes, an estimation line may be derived to be used for RFEC estimation. In this case, $t_n, t_m, \phi_n$ and $\phi_m$ parameters in FIG. 2 are defined as:

$$\phi_n = \phi_M \tag{6}$$

$$\phi_m = \phi_{M-1} \tag{7}$$

$$t_n = \sum_{i=1}^{M} T_i \tag{8}$$

$$t_m = \sum_{i=1}^{M} T_i \tag{9}$$

An estimation line (slope of the line) that is derived from the transition of the log from M pipes to M−1 pipes may be employed for the estimation of overall thickness change when EM logging tool 100 is logging M pipes or M−1 pipes.

Using Phase Difference measured for M pipes and M−N pipes for overall thickness estimation in any arbitrary section (any number of pipes). This estimation line may be also derived using the measured phase for M pipes and M−N pipes. In this case, using the values of $\phi_{M-N}$ and $\phi_M$ and the pre-known nominal thickness for the M pipes, an estimation line can be derived to be used for RFEC estimation. In this case, $t_n, t_m, \phi_n,$ and $\phi_m$ parameters in FIG. 2 are defined as:

$$\phi_n = \phi_M \tag{10}$$

$$\phi_m = \phi_{M-N} \tag{11}$$

$$t_n = \sum_{i=1}^{M} T_i \tag{12}$$

$$t_m = \sum_{i=1}^{M-N} T_i \tag{13}$$

Using the slope of such estimation line, any phase difference between the nominal section and defected section of the pipes in sections with M' pipes may be inverted to the overall thickness change (difference between overall thickness at the defected section and overall thickness at the nominal section for the corresponding number of pipes).

Combining several estimation lines: One or more estimation lines derived with any of the methods disclosed above may be combined to produce a single estimation line for any other arbitrary number of pipes.

If the slopes of N estimation lines derived from any of the above-mentioned methods are denoted by $m_1, m_2, \ldots, m_N$, these can be combined with proper weights (W) to produce an overall estimation line with slope of $m_t$ as:

$$m_t = \sum_{i=1}^{N} W_i m_i \tag{14}$$

Another method may be to combine the estimated overall thickness changes $\Delta T_1, \ldots \Delta T_N$, from each individual estimation line. These may be combined for example in a weighted sum to produce a final estimation of the overall thickness change for the pipes as:

$$T_t = \sum_{i=1}^{N} W_i \Delta T_i \tag{15}$$

Figure 4:
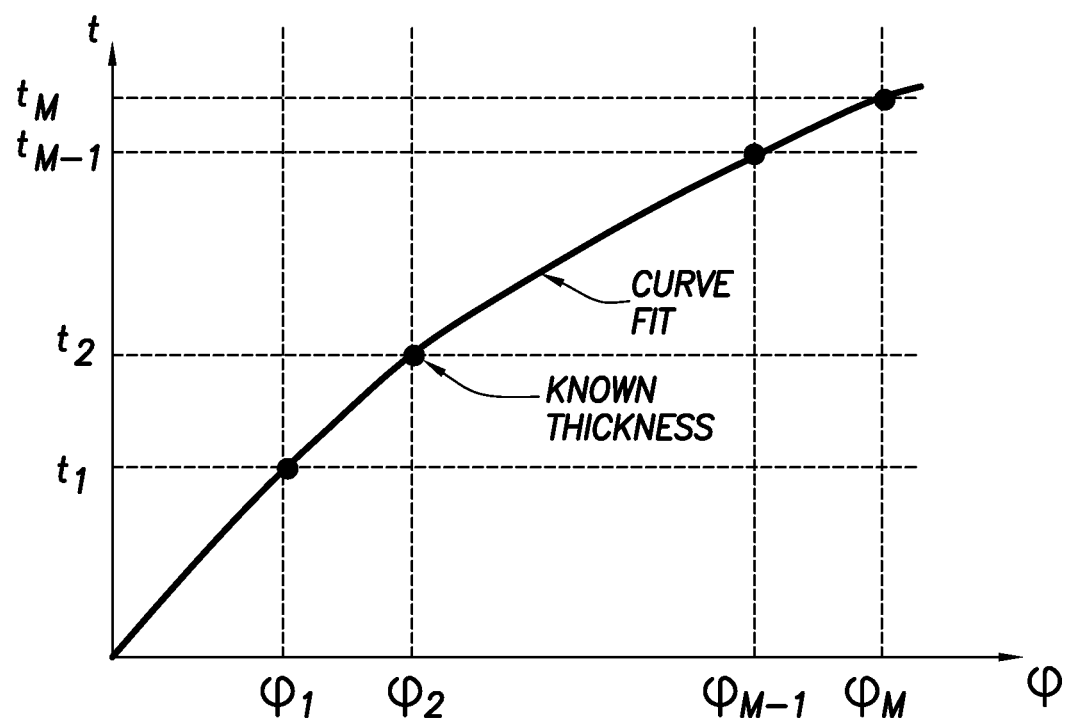
FIG. 4 illustrates example interpolation/extrapolation estimations.

Interpolation/extrapolation estimation: Another method may be to fit the thickness and phase data per pipe to a functional to interpolate/extrapolate to any given phase. Graphically this can be represented, as shown in FIG. 4. Coefficients $C_S$ of the functional f can be calculated as:

$$C_S = \underset{C}{\mathrm{argmin}} \left( \sum_{i=1}^{N} (f(C, \Phi_i) - t_i)^2 \right) \tag{16}$$

Functional f may be a polynomial where coefficients $C_S$ are polynomial coefficients. Functional f may be a Gaussian-quadrature fit, where $C_S$ are Gaussian-quadrature coefficients. After calculation of the coefficients $C_S$, for any given depth in the well where phase measurement is $\phi$ the thickness t can be calculated as:

$$t = (C_S, \phi) \tag{17}$$

Determination of the nominal phase: the above methods may require determination of nominal phases $\phi$ for each of M pipes $i=1, \ldots, M$. Nominal thicknesses $t_i$ may be available from a given well plan that defines the beginning depth points $ds_i$ and the end depth points $de_i$, which may be converted to a thickness curve consistent with the well plan as a function of depth t(d). Measurements from the EM logging tool 100 may also be a function of depth d, and may be represented as $\phi(d)$. Once the nominal phase response is obtained by one of the following methods, using that and the sum of nominal thickness values at the corresponding sections may be employed for deriving the RFEC estimation line.

Simple average: the phase associated with the section may be calculated as the average of all phase measurements in that section:

$$\Phi_i = \frac{1}{de_i - ds_i} \int_{ds_i}^{de_i} \Phi(d)dd \quad (18)$$

Histogram per pipe: a histogram H(ϕ) of phase values ϕ(d) may be generated for each pipe:

$$H_i(\phi) = \text{Histogram}(\phi(d)|_{ds_i < d < de_i}) \quad (19)$$

Value that corresponds to the peak of the histogram may be chosen as the selected phase:

$$\Phi_i = \underset{\Phi}{\text{argmax}}(H_i(\Phi)) \quad (20)$$

Histogram: a histogram H(ϕ) of phase values ϕ(d) may be generated for the whole well:

$$H(\phi) = \text{Histrogram}(\phi(d)) \quad (21)$$

Value that corresponds to the peaks of the histogram may be chosen as the selected phases:

$$\Phi_i = \frac{dH(\Phi_i)}{d\Phi_i} \quad (22)$$

$$\frac{d^2 H(\Phi_i)}{d\Phi_i^2} < 0 \quad (23)$$

The advantage may be that the start and end points of the pipe section in the well plan may not need to be known.

Using other features on the pipes: In the techniques described above, it may be proposed to produce the RFEC estimation line from at least two sections in the log related to different numbers of pipes. However, these techniques may also be implemented assuming that there are known features such as collars on a section of log with fixed number of pipes. These features may be long enough along the depth (two or three times larger than the maximum of length of the transmitter (e.g., transmitter 102, shown on FIG. 1) and receiver coils (e.g., receiver 104, shown on FIG. 1) in order to be able to use RFEC approximations. In such case, the phase difference between the nominal sections of the pipes without and with these features and the overall thickness change due to these features can be employed to establish the RFEC estimation line. This line can be then used to estimate overall thickness estimation for defected sections with the same or different number of pipes. Also, estimation lines derived this way may be combined in a similar manner to the techniques described above.

To facilitate a better understanding of the present disclosure, the following examples of certain aspects of some of the systems and methods are given. In no way should the following examples be read to limit, or define, the entire scope of the disclosure.

EXAMPLES

Figure 5C:
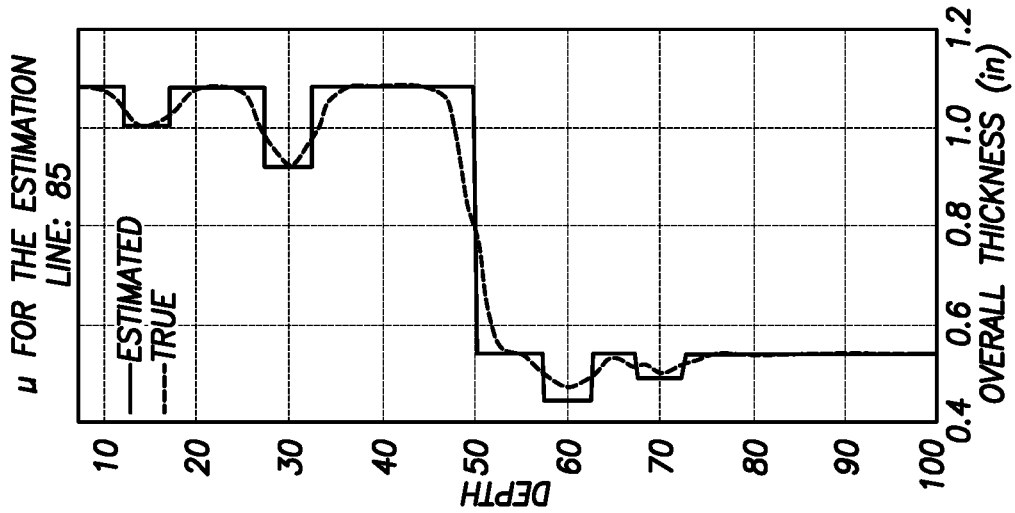
FIG. 5 illustrates a graphical example comparing the overall thickness estimation with the true overall thickness variation along the depth.
Figure 5B:
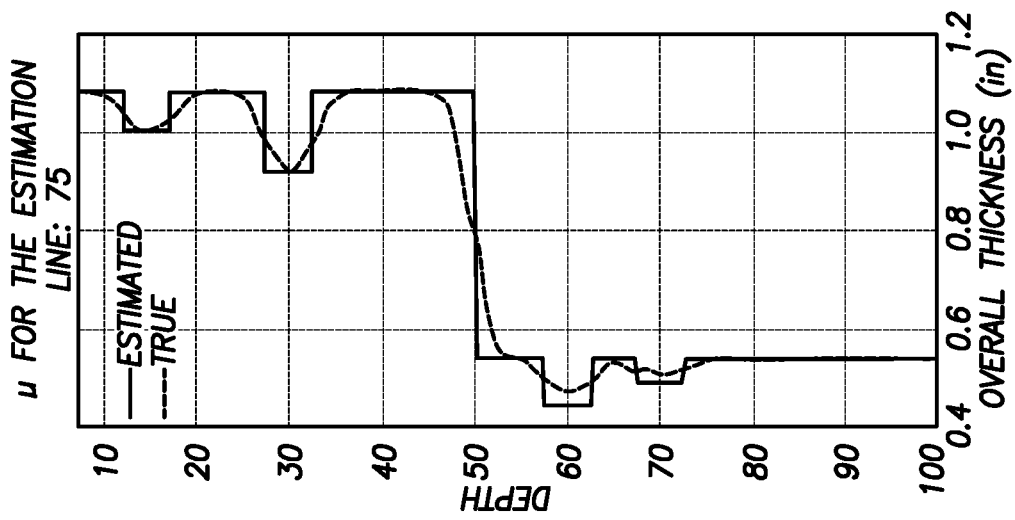
Figure 5A:
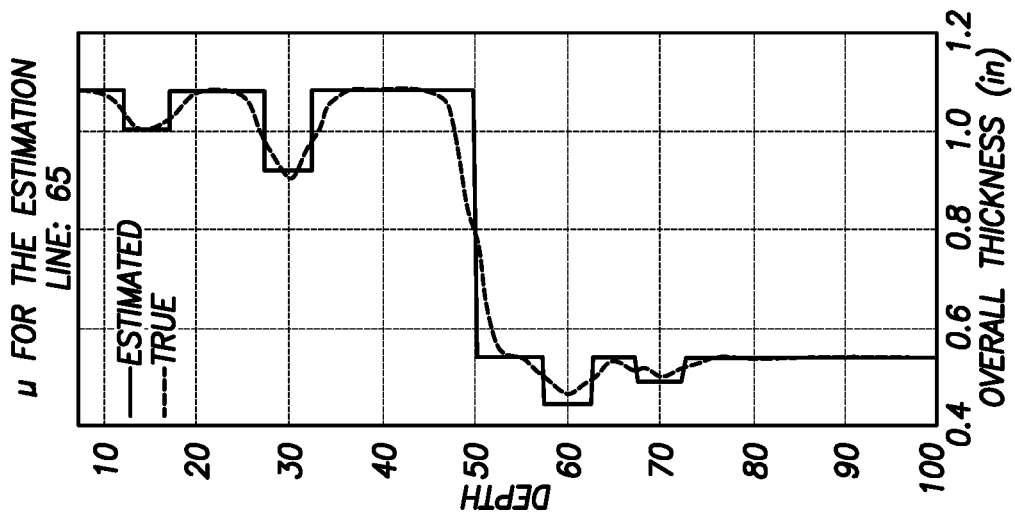

Example 1: a transmitter (e.g., transmitter 102, as shown on FIG. 1) and a receiver (e.g., receiver 104, as shown on FIG. 1) are being employed for RFEC estimation of a configuration of pipes that has a transition from three pipes to two pipes, as shown on FIGS. 3A and 3B. The receiver 104 may be placed at a distance of 40 in (101 cm) from transmitter 102 and the data is acquired at 1 Hz. Table 1 shows the parameters of the pipes and the defect locations and dimensions. FIG. 5 shows the results for Example 1: Comparison of the estimated and true overall thickness variations along the depth for three cases in which the estimation lines are derived for the pipes with relative magnetic permeabilities of 65, 75, and 85. The relative magnetic permeability of the defected sections may be 75.

TABLE 1

Parameters of the pipes and defects for Example 1.

| Pipe No. | Outer Diameter | Thickness | Defect Dimensions Length × Depth | Position of defect |
|---|---|---|---|---|
| Pipe 1 | 2⅞ in (7.3 cm) | 0.217 in (0.55 cm) | No defect | No defect |
| Pipe 2 | 7 in (17.8 cm) | 0.324 in (0.82 cm) | 5 ft × 0.097 in (1.5 m × 0.25 cm) | 60 ft (18.3 m) |
|  |  |  | 5 ft × 0.048 in (1.5 m × 0.12 cm) | 70 ft (21.3 m) |
| Pipe 3 | 9⅝ in (24.45 cm) | 0.545 in (1.38 cm) | 5 ft × 0.163 in (1.5 m × 0.41 cm) | 30 ft (9.1 m) |
|  |  |  | 5 ft × 0.081 in (1.5 m × 0.21 cm) | 15 ft (4.6 m) |

The estimation line may be established according to the phase difference between the measured phase at the section with three pipes and the section with two pipes both with nominal sections of the pipes. This estimation line may then be used to perform estimation of the overall thickness of the pipes along the depth. FIG. 5 compares the overall thickness estimation with the true overall thickness variation along the depth. It may be observed that the estimated values match the true values.

It is expected that the permeability of the pipes may change along the depth. Three RFEC estimation lines based on three pipes to two pipes transitions when the relative magnetic permeabilities of the pipes are about 65, 75, and 85 may be derived. Then, these estimation lines may be employed for thickness estimation of the defected sections in which the pipes have relative magnetic permeability of about 75. FIG. 5 compares the overall thickness estimation results with the true ones for these three cases. It may be observed that the results do not change much when using RFEC estimation lines derived from pipes with slightly different permeabilities.

Figure 6C:
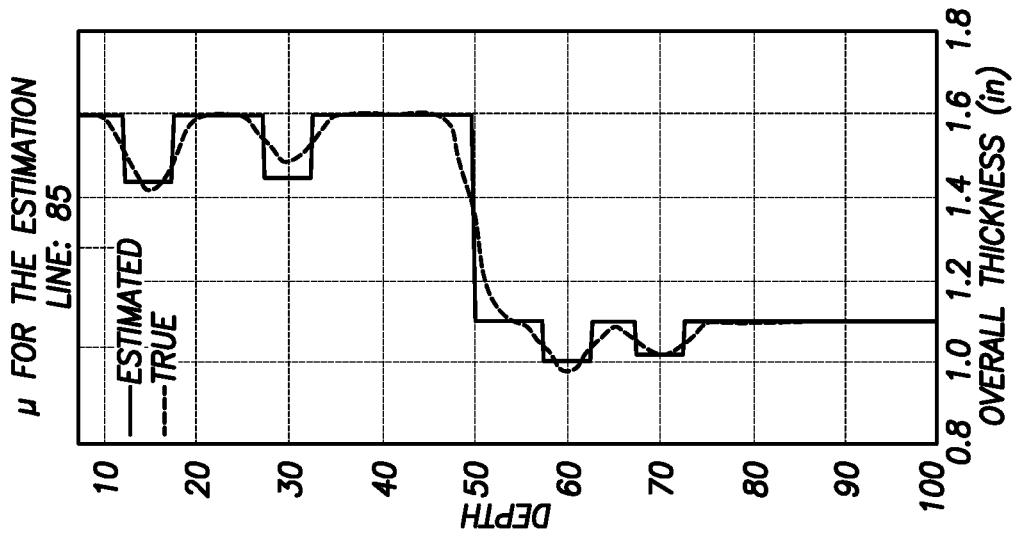
FIG. 6 illustrates another graphical example comparing the overall thickness estimation with the true overall thickness variation along the depth.
Figure 6B:
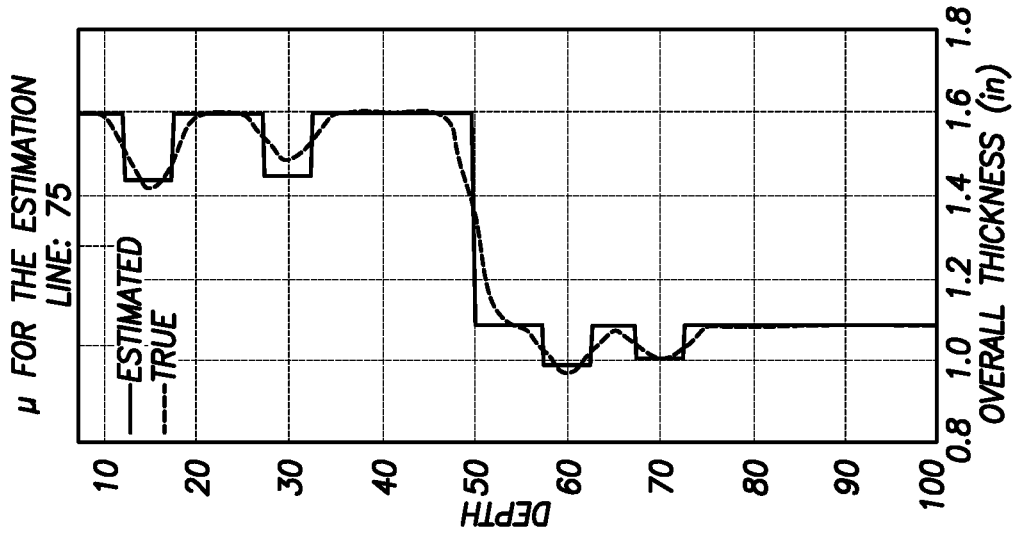
Figure 6A:
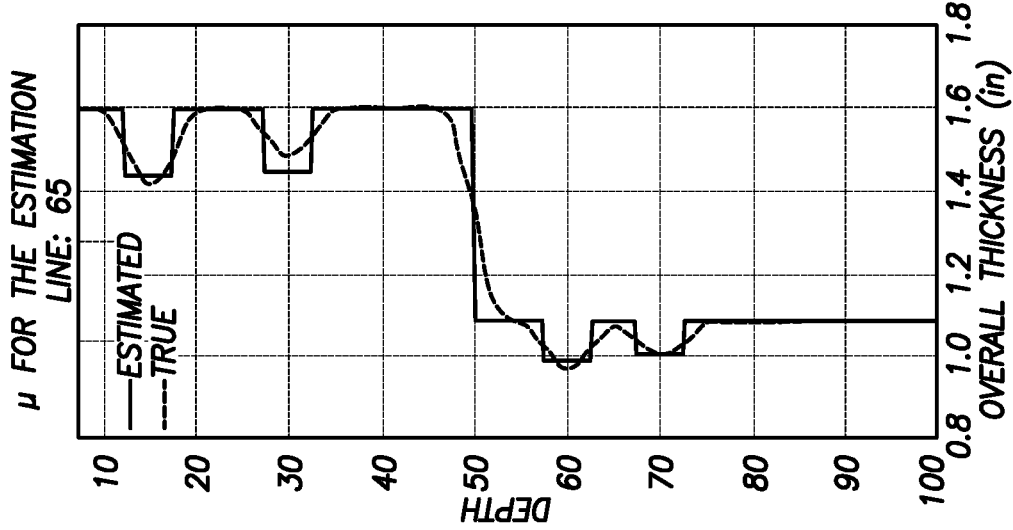

Example 2: a transmitter (e.g., transmitter 102, as shown on FIG. 1) and a receiver (e.g., receiver 104, as shown on FIG. 1) are being employed for RFEC estimation of a configuration of pipes that has a transition from four pipes to three pipes. The receiver 104 may be placed at a distance of about 40 in (102 cm) from the transmitter 102 and the data may be acquired at about 1 Hz. Table 2 shows the parameters of the pipes and the defect locations and dimensions. FIG. 6 shows the results for Example 2: Comparison of the estimated and true overall thickness variations along the depth for three cases in which the estimation lines are derived for the pipes with relative magnetic permeabilities of about 65, 75, and 85. The relative magnetic permeability of the defected sections may be about 75.

TABLE 2

Parameters of the pipes and defects for Example 2

| Pipe No. | Outer Diameter | Thickness | Defect Dimensions Length × Depth | Position of defect |
|---|---|---|---|---|
| Pipe 1 | 2⅞ in (7.3 cm) | 0.217 in (0.55 cm) | No defect | No defect |
| Pipe 2 | 7 in (17.8 cm) | 0.324 in (0.82 cm) | 5 ft × 0.097 in (1.5 m × 0.25 cm) | 60 ft (18.3 m) |
| Pipe 3 | 9⅝ in (24.45 cm) | 0.545 in (1.38 cm) | 5 ft × 0.163 in (1.5 m × 0.41 cm) | 15 ft (m) |
|  |  |  | 5 ft × 0.081 in (1.5 m × 0.21 cm) | 70 ft (21.3 m) |
| Pipe 4 | 13⅜ in (34 cm) | 0.514 in (1.31 cm) | 5 ft × 0.154 in (1.5 m × 0.39 cm) | 30 ft (9.1 m) |

The estimation line may be established according to the phase difference between the measured phase at the section with four pipes and the section with three pipes both with nominal sections of the pipes. This estimation line may then be used to perform estimation of the overall thickness of the pipes along the depth. FIG. 6 compares the overall thickness estimation with the true overall thickness variation along the depth. It may be observed that the estimated values match the true values.

It may be expected that the permeability of the pipes may change along the depth. Three RFEC estimation lines based on three pipes to two pipes transitions when the relative magnetic permeabilities of the pipes are 65, 75, and 85 may be derived. Then, these estimation lines may be employed for thickness estimation of the defected sections in which the pipes have relative magnetic permeability of 75. FIG. 6 compares the overall thickness estimation results with the true ones for these three cases. It may be observed that the results do not change much when using RFEC estimation lines derived from pipes with slightly different permeabilities.

Accordingly, this disclosure describes systems and methods that may be used for corrosion detection of downhole tubulars. Without limitation, the systems and methods may further be characterized by one or more of the following statements:

Statement 1: A method may comprise disposing an electromagnetic logging tool in a wellbore, wherein the electromagnetic logging tool may comprise a transmitter and a receiver; making a first measurement with the electromagnetic logging tool in a first nominal section of the wellbore, wherein the first nominal section may comprise M pipes, wherein M may be a number of pipes positioned in the first nominal section; making a second measurement with the electromagnetic logging tool in a second nominal section of the wellbore, wherein the second nominal section may comprise N pipes, wherein N may be a number of pipes in the second nominal section, wherein N may be different than M; calculating a phase difference between the first and second measurements; calculating a thickness difference between the first and second measurements; calculating a first slope from at least the phase difference and the thickness difference; making a third measurement in a non-nominal section of the wellbore; and calculating a thickness associated with a depth of the third measurement using at least the first slope and the third measurement.

Statement 2: The method of Statement 1, further comprising making an operational decision based on the thickness associated with the depth of the third measurement.

Statement 3: The method of Statement 1 or Statement 2, wherein the first, second, and third measurements may be made in a remote field eddy current regime.

Statement 4: The method of any preceding statement, wherein the remote field eddy current regime may comprise a frequency of about 1 Hz and a spacing of about 12 inches to about 60 inches between the transmitter and receivers.

Statement 5: The method of any preceding statement, further comprising making a fourth measurement with the electromagnetic logging tool in a third nominal section of the wellbore, wherein the third nominal section may comprise K pipes.

Statement 6: The method of any preceding statement, further comprising making a fifth measurement with the electromagnetic logging tool in a fourth nominal section of the wellbore, wherein the fourth nominal section may comprise L pipes, wherein L may be different than K.

Statement 7: The method of any preceding statement, further comprising calculating a phase difference between the fourth and fifth measurements.

Statement 8: The method of any preceding statement, further comprising calculating a thickness difference between the fourth and fifth measurements.

Statement 9: The method of any preceding statement, further comprising calculating a second slope from the phase difference between the fourth and fifth measurements and the thickness difference between the fourth and fifth measurements.

Statement 10: The method of any preceding statement, further comprising making a sixth measurement in a non-nominal section of the wellbore.

Statement 11: The method of any preceding statement, further comprising calculating a thickness associated with a depth of the sixth measurement using at least the first and second slope.

Statement 12: The method of any preceding statement, further comprising making an operational decision based on the thickness associated with the depth of the sixth measurement.

Statement 13: The method of any preceding statement, wherein the operational decision may comprise well intervention or production decisions.

Statement 14: The method of any preceding statement, further comprising calculating thicknesses associated with the third and sixth measurements using a linear combination of the first and second slopes.

Statement 15: A corrosion detection system may comprise: an electromagnetic logging tool, wherein the electromagnetic logging tool may comprise: a transmitter; a receiver; an information handling system configured to: make a first measurement in a first nominal section of a wellbore, wherein the first nominal section may comprise M pipes, wherein M may be a number of pipes positioned in the first nominal section; make a second measurement in a second nominal section of the wellbore, wherein the second nominal section may comprises N pipes, wherein N may be a number of pipes in the second nominal section, wherein N may be different than M; calculate a phase difference between the first and second measurements; calculate a thickness difference between the first and second measurements; calculate a first slope from at least the phase difference and the thickness difference; make a third measurement in a non-nominal section of the wellbore; and calculate a thickness associated with a depth of the third measurement using the first slope and the third measurement.

Statement 16: The corrosion detection system of Statement 15, wherein N=M-1.

Statement 17: The corrosion detection system of Statement 15 or Statement 16, wherein the first, second, and third measurements may be made in a remote field eddy current regime.

Statement 18: The corrosion detection system of any one of Statements 15 through 17, wherein the remote field eddy current regime may comprise a frequency of about 1 Hz to about 200 HZ and a spacing of about 12 inches to about 60 inches between the transmitter and the receiver.

Statement 19: The corrosion detection system of any one of Statements 15 through 18, wherein the transmitter may comprise a coil, a solenoid, or combinations thereof, and wherein the receiver may comprise a coil, a magnetometer, a solenoid winding, or combinations thereof.

Statement 20: The corrosion detection system of any one of Statements 15 through 19, wherein the information handling system is further configured to: make a fourth measurement in a third nominal section of the wellbore, wherein the third nominal section may comprise K pipes; make a fifth measurement in a fourth nominal section of the wellbore, wherein the fourth nominal section may comprise L pipes, wherein L may be different than K; calculate a phase difference between the fourth and fifth measurements; calculate a thickness difference between the fourth and fifth measurements; calculate a second slope from the phase difference between the fourth and fifth measurements and the thickness difference between the fourth and fifth measurements; and make a sixth measurement in a non-nominal section of the wellbore.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
 disposing an electromagnetic logging tool in a wellbore, wherein the electromagnetic logging tool comprises a transmitter and a receiver;
 making a first measurement with the electromagnetic logging tool in a first nominal section of the wellbore, wherein the first nominal section comprises M pipes, wherein M is a number of pipes positioned in the first nominal section, wherein the first measurement is of a first mutual impedance between the transmitter and the receiver;

making a second measurement with the electromagnetic logging tool in a second nominal section of the wellbore, wherein the second nominal section comprises N pipes, wherein N is a number of pipes in the second nominal section, wherein N is different than M, wherein the second measurement is of a second mutual impedance between the transmitter and the receiver;

calculating a phase difference between the first and second measurements;

calculating a thickness difference between the first and second measurements;

calculating a first slope from at least the phase difference and the thickness difference;

making a third measurement in a non-nominal section of the wellbore; and calculating a thickness associated with a depth of the third measurement using at least the first slope and the third measurement.

2. The method of claim 1, further comprising making an operational decision based on the thickness associated with the depth of the third measurement.

3. The method of claim 1, wherein the first, second, and third measurements are made in a remote field eddy current regime.

4. The method of claim 3, wherein the remote field eddy current regime comprises a frequency of about 1 Hz and a spacing of about 12 inches to about 60 inches between the transmitter and receivers.

5. The method of claim 1, further comprising making a fourth measurement with the electromagnetic logging tool in a third nominal section of the wellbore, wherein the third nominal section comprises K pipes.

6. The method of claim 5, further comprising making a fifth measurement with the electromagnetic logging tool in a fourth nominal section of the wellbore, wherein the fourth nominal section comprises L pipes, wherein L is different than K.

7. The method of claim 6, further comprising calculating a phase difference between the fourth and fifth measurements.

8. The method of claim 7, further comprising calculating a thickness difference between the fourth and fifth measurements.

9. The method of claim 8, further comprising calculating a second slope from the phase difference between the fourth and fifth measurements and the thickness difference between the fourth and fifth measurements.

10. The method of claim 9, further comprising making a sixth measurement in a non-nominal section of the wellbore.

11. The method of claim 10, further comprising calculating a thickness associated with a depth of the sixth measurement using at least the first and second slope.

12. The method of claim 11, further comprising making an operational decision based on the thickness associated with the depth of the sixth measurement.

13. The method of claim 12, wherein the operational decision comprises well intervention or production decisions.

14. The method of claim 12, further comprising calculating thicknesses associated with the third and sixth measurements using a linear combination of the first and second slopes.

15. A corrosion detection system comprising:
an electromagnetic logging tool, wherein the electromagnetic logging tool comprises:
 a transmitter;
 a receiver;
an information handling system configured to:
 make a first measurement in a first nominal section of a wellbore, wherein the first nominal section comprises M pipes, wherein M is a number of pipes positioned in the first nominal section, wherein the first measurement is of a first mutual impedance between the transmitter and the receiver;
 make a second measurement in a second nominal section of the wellbore, wherein the second nominal section comprises N pipes, wherein N is a number of pipes in the second nominal section, wherein N is different than M, wherein the second measurement is of a second mutual impedance between the transmitter and the receiver;
 calculate a phase difference between the first and second measurements;
 calculate a thickness difference between the first and second measurements;
 calculate a first slope from at least the phase difference and the thickness difference;
 make a third measurement in a non-nominal section of the wellbore; and
 calculate a thickness associated with a depth of the third measurement using the first slope and the third measurement.

16. The system of claim 15, wherein N=M−1.

17. The system of claim 15, wherein the first, second, and third measurements are made in a remote field eddy current regime.

18. The system of claim 17, wherein the remote field eddy current regime comprises a frequency of about 1 Hz to about 200 HZ and a spacing of about 12 inches to about 60 inches between the transmitter and the receiver.

19. The system of claim 15, wherein the transmitter comprises a coil, a solenoid, or combinations thereof, and wherein the receiver comprises a coil, a magnetometer, a solenoid winding, or combinations thereof.

20. The system of claim 15, wherein the information handling system is further configured to:
 make a fourth measurement in a third nominal section of the wellbore, wherein the third nominal section comprises K pipes;
 make a fifth measurement in a fourth nominal section of the wellbore, wherein the fourth nominal section comprises L pipes, wherein L is different than K;
 calculate a phase difference between the fourth and fifth measurements;
 calculate a thickness difference between the fourth and fifth measurements;
 calculate a second slope from the phase difference between the fourth and fifth measurements and the thickness difference between the fourth and fifth measurements; and
 make a sixth measurement in a non-nominal section of the wellbore.

* * * * *